(12) United States Patent
Crompton et al.

(10) Patent No.: US 8,844,974 B1
(45) Date of Patent: Sep. 30, 2014

(54) CROSS PLATFORM GRIP RING RELEASE DEVICE AND METHOD

(71) Applicant: Quick Fitting, Inc., Warwick, RI (US)

(72) Inventors: David B. Crompton, Wampanoag, RI (US); Libardo Ochoa Dias, Pawtucket, RI (US)

(73) Assignee: Quick Fitting, Inc., Warwick, RI (US)

( * ) Notice: Subject to any disclaimer, the term of this patent is extended or adjusted under 35 U.S.C. 154(b) by 0 days.

(21) Appl. No.: 14/144,925

(22) Filed: Dec. 31, 2013

(51) Int. Cl.
*F16L 35/00* (2006.01)
*F16L 37/091* (2006.01)

(52) U.S. Cl.
CPC ................... *F16L 37/091* (2013.01)
USPC ............................ 285/39; 285/304

(58) Field of Classification Search
CPC ..................... F16L 37/091; F16L 37/0982
USPC ........... 285/39, 414, 400, 396, 340, 233, 234; 29/237
See application file for complete search history.

(56) References Cited

U.S. PATENT DOCUMENTS

| | | | | |
|---|---|---|---|---|
| 977,472 | A | * | 12/1910 | Pilkington ...................... 285/39 |
| 2,774,616 | A | * | 12/1956 | Dodd et al. ..................... 285/33 |
| 3,428,337 | A | * | 2/1969 | Read ............................... 285/18 |
| 3,709,526 | A | * | 1/1973 | Cromie ........................... 285/73 |
| 3,821,670 | A | * | 6/1974 | Thompson .................... 333/255 |
| 5,425,347 | A | * | 6/1995 | Zinke, II .................. 123/568.11 |
| 5,524,936 | A | * | 6/1996 | Barr et al. ....................... 285/39 |
| 7,862,089 | B2 | | 1/2011 | Crompton |
| 7,942,161 | B2 | | 5/2011 | Crompton |
| 8,205,915 | B1 | | 6/2012 | Crompton |
| 8,210,576 | B2 | | 7/2012 | Crompton |
| 8,398,122 | B2 | | 3/2013 | Crompton |
| 8,480,134 | B2 | | 7/2013 | Crompton |

\* cited by examiner

*Primary Examiner* — Aaron Dunwoody
(74) *Attorney, Agent, or Firm* — Williams Mullen, P.C.; Thomas F. Bergert

(57) ABSTRACT

The present invention provides, in part, a device that can fit around a fitting retention compartment of a pipe fitting, apply axial pressure to a pipe insertion component so as to flex the teeth of a fastening ring inwardly, which permits smooth insertion and removal of piping elements. In embodiments, the device comprises a two-piece device with mating threads that permit the pieces to move toward and away from one another with minute adjustments.

23 Claims, 4 Drawing Sheets

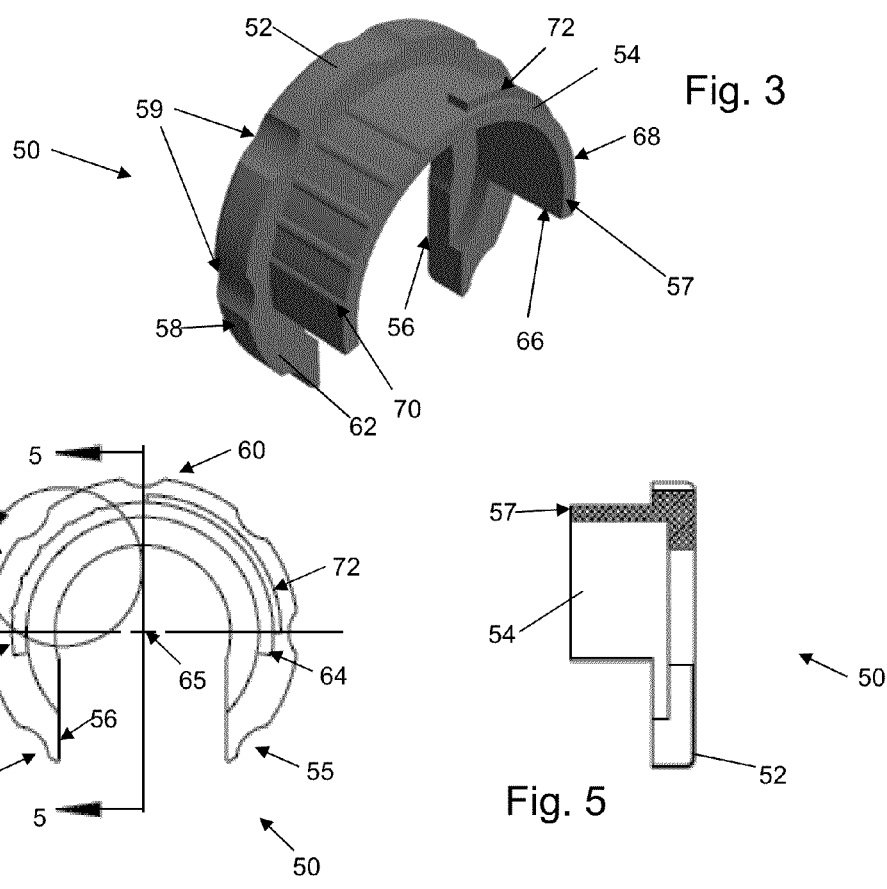
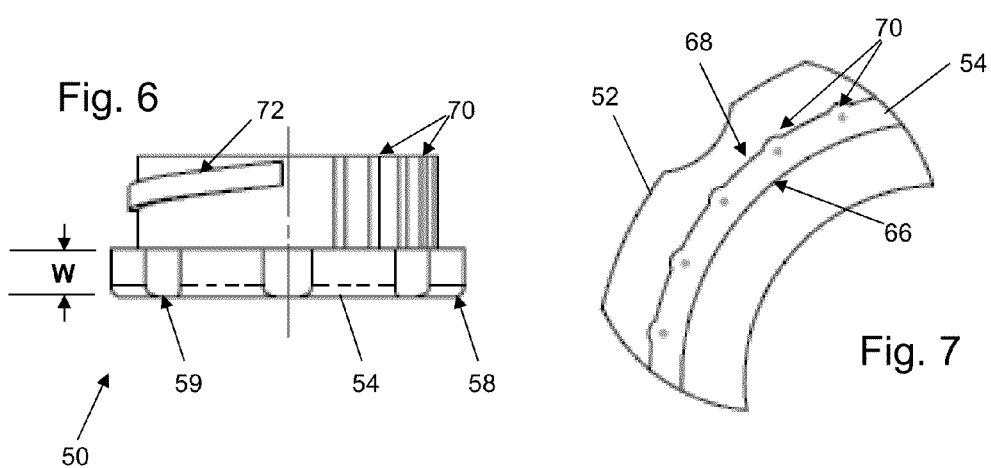

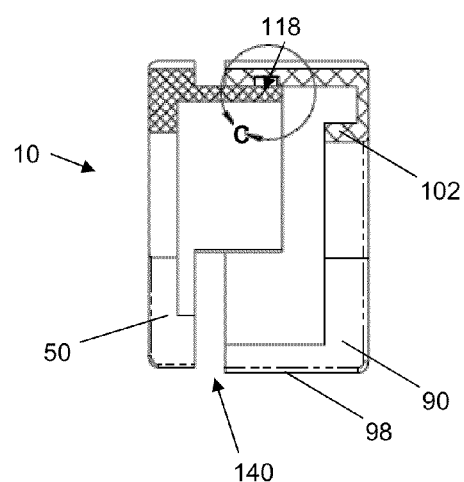
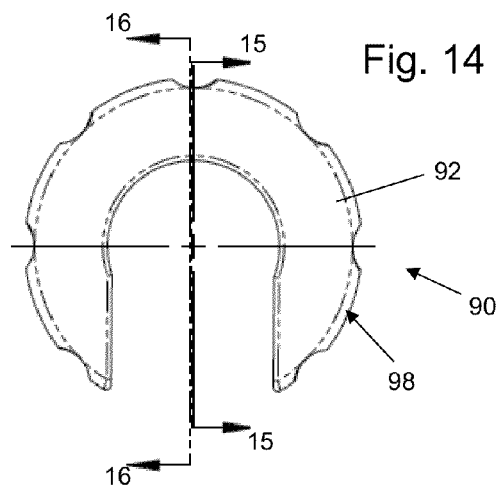
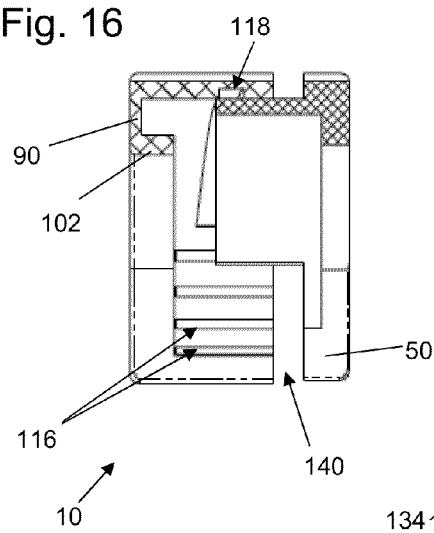
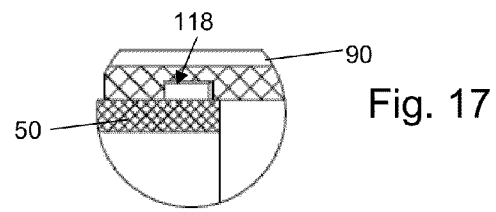
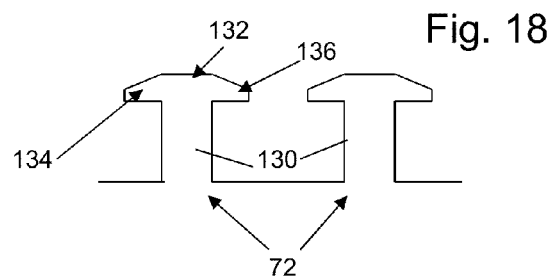

CROSS PLATFORM GRIP RING RELEASE DEVICE AND METHOD

TECHNICAL FIELD

The present invention relates to fluid flow systems, and more particularly to piping release tools for use in fluid flow systems.

BACKGROUND AND SUMMARY

Piping systems exist to facilitate the flow of fluids (e.g., liquid, steam, gas (such as air) or plasma). For example, homes, schools, medical facilities, commercial buildings and other occupied structures generally require integrated piping systems so that water and/or other fluids can be circulated for a variety of uses. Liquids and/or gases such as cold and hot water, breathable air, glycol, compressed air, inert gases, cleaning chemicals, waste water, plant cooling water and paint and coatings are just some examples of the types of fluids and gases that can be deployed through piping systems. Tubing and piping types can include, for example, copper, stainless steel, CPVC; (chlorinated polyvinyl chloride) and PEX (cross-linked polyethylene). For purposes of the present disclosure, the terms "pipe", "piping", "tube" or "tubing" will be understood to encompass one or more pipes, tubes, piping elements and/or tubing elements, and may be used interchangeably.

Piping connections are necessary to join various pieces of pipe and must be versatile in order to adapt to changes of pipe direction required in particular piping system implementations. For example, fittings and valves may be employed at the ends of open pieces of pipe that enable two pieces of pipe to fit together in a particular configuration. Among fitting types there are elbows, "tees", couplings adapted for various purposes such as pipe size changes, ends, ball valves, stop valves, and partial angle connectors, for example.

In the past, pipe elements have been traditionally connected by welding and/or soldering them together using a torch. Soldering pipe fittings can be time-consuming, unsafe, and labor intensive. Soldering also requires employing numerous materials, such as copper pipes and fittings, emery cloths or pipe-cleaning brushes, flux, silver solder, a soldering torch and striker, a tubing cutter and safety glasses, for example. The process for soldering pipes can proceed by first preparing the pipe to be soldered, as the copper surface must be clean in order to form a good joint. The end of the pipe can be cleaned on the outside with emery cloth or a specially made wire brush. The inside of the fitting must be cleaned as well. Next, flux (a type of paste) can be applied to remove oxides and draw molten solder into the joint where the surfaces will be joined. The brush can be used to coat the inside of the fitting and the outside of the pipe with the flux. Next, the two pipes are pushed together firmly into place so that they "bottom out"—i.e., meet flush inside the fitting. The tip of the solder can be bent to the size of the pipe in order to avoid over-soldering. With the pipes and fitting in place, the torch is then ignited with the striker or by an auto-strike mechanism to initiate soldering. After heating for a few moments, if the copper surface is hot enough such that it melts when touched by the end of the solder, the solder can then be applied to the joint seam so that it runs around the joint and bonds the pipe and fitting together.

In addition to welding methods, push-fit technology has been employed with piping systems to reduce the dangers and time involved in soldering joints. Push-fit methods require minimal knowledge of pipe fittings and involve far fewer materials than soldering. For example, one may only need the pipes, quick-connect fittings, a chamfer/de-burring tool and tubing cutter in order to connect pipes using push-fit technology.

The steps involved in connecting piping systems using push-fit technology can be outlined as follows. First, the pipe is cut to the appropriate length and the end of the pipe is cleaned with the de-burring tool. Then the pipe and fitting are pushed together for connection. The fitting is provided with a fastening ring (also called a collet, grip ring or grab ring) having teeth that grip the pipe as it is inserted. The fastening ring device is employed to provide opposing energy, preventing the device from disconnection while creating a positive seal. Accordingly, no wrenches, clamping, gluing or soldering is involved. Push-fit and/or quick-connect technology for piping systems can be obtained, for example, through Quick Fitting, Inc. of East Providence, R.I., USA, suppliers of the CoPro® line of push fittings and related products. Also, such technology is described, for example, in U.S. Pat. No. 7,862,089, U.S. Pat. No. 7,942,161, U.S. Pat. No. 8,205,915, U.S. Pat. No. 8,210,576, U.S. Pat. No. 8,398,122 and U.S. Pat. No. 8,480,134, the disclosures of which are incorporated herein by reference in their entireties.

In past pipe coupling technology, the fastening ring is inserted into the fitting body along with a plastic grip ring support that typically fails under extensive tensile testing. Further, the coupling must then be either coin rolled, glued or receive a threaded cap member to retain the fastening ring inside the fitting body. In addition to the added steps for the manufacture and assembly of the coupling, the strength of the plumbing joint is determined by the retaining cap member. The additional steps and components add significant labor and manufacturing costs to the final product cost and reduce the overall production capability due to the extensive time required for proper assembly.

In addition to the above, when using a threaded retaining cap method, the process of cutting threads into the fitting body and the retaining cap elevates the cost of machining the fitting components. Further, the threaded end cap method requires mechanical assembly as well as the added cost and application of a thread sealant to the threads. In prior efforts that employ a coined retaining cap method, the process of coining the fitting body as the retaining cap significantly increases the cost of final assembly of the fitting. Additionally, the coining process permanently encapsulates the fastening ring inside the fitting, whereby the fastening ring cannot be removed without complete destruction of the ring and fitting.

Along with additional assembly steps and increased manufacturing costs, past pipe fittings and connection methods do not allow repair for various reasons. In some cases, this is because they are factory sealed, for example. In other cases, it is because the separation of the fitting from the pipe can damage or induce wear on the parts. For example, some push-to-connect fittings provide permanently fixed demounting rings for removing the fittings. The demounting rings can be depressed axially to lift the fastening ring teeth off of the surface of the inserted pipe, such that the pipe can then be withdrawn. This arrangement, however, can subject the fittings to tampering and shorter life. In addition, while fastening ring devices work effectively as an opposing retaining member, their functionality makes them nearly impossible to dismount, remove or detach for re-use. The fastening rings are thus permanently affixed unless they are cut and removed, which then destroys the fastening ring.

The present invention, in part, assists in inserting or removing pipes from push-fit fittings by providing a device that can fit around a fitting retention compartment, apply axial pressure to a pipe insertion component so as to flex the teeth of a fastening ring inwardly, which permits smooth insertion and removal of piping elements. The device can then relax the axial pressure on the pipe insertion component, which then allows the fastening ring teeth to relax back into position. In one embodiment, the present invention comprises a two-piece device with mating threads that permit the pieces to move toward and away from one another with minute adjustments.

BRIEF DESCRIPTION OF THE DRAWINGS

FIG. 3 is a perspective view of one embodiment of a first locking member of the device of the present invention.

FIG. 4 shows a front view of one embodiment of a first locking member of the present invention.

FIG. 5 shows a right-side cross-sectional view of one embodiment of the first locking member of the present invention taken along the line 5-5 of FIG. 4.

FIG. 6 shows a top plan view of the first locking member of FIG. 4.

FIG. 7 is a detailed view of encircled portion A of FIG. 4.

FIG. 14 is a right side view of one embodiment of the device of the present invention.

FIG. 15 is a front cross-sectional view of one embodiment of the device of the present invention taken along the line 15-15 of FIG. 14.

FIG. 16 is a rear cross-sectional view of one embodiment of the device of the present invention taken along the line 16-16 of FIG. 14.

FIG. 17 is a detailed view of encircled portion C of FIG. 15.

FIG. 18 shows male thread members of a first locking member in accordance with one embodiment of the present invention.

DETAILED DESCRIPTION OF EMBODIMENTS OF THE PRESENT INVENTION

Figure 1:
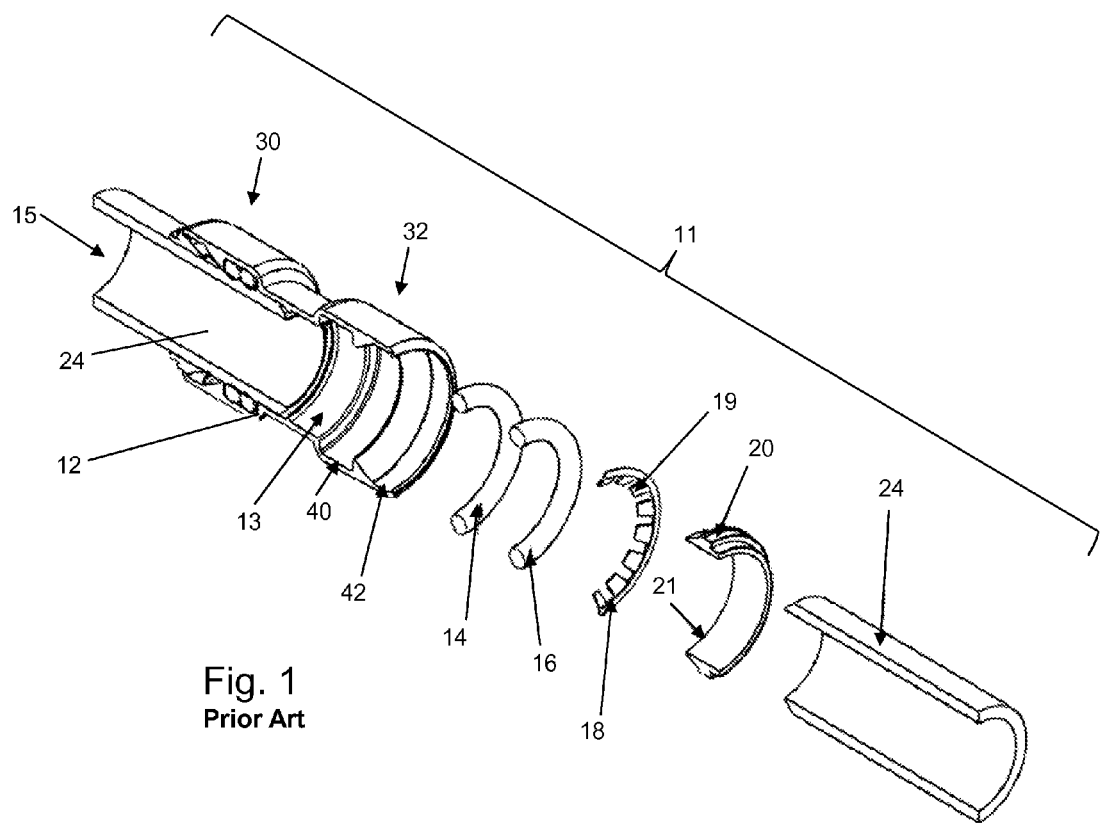
FIG. 1 shows an exploded cross-sectional view of a fitting and components that can be used with the present invention.
Figure 2:
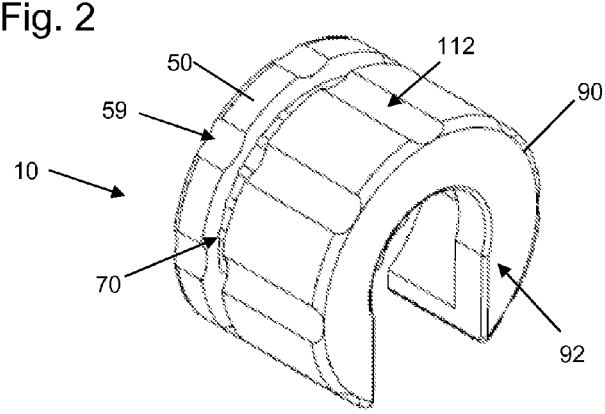
FIG. 2 is a perspective view of one embodiment of the device of the present invention.
Figure 8:
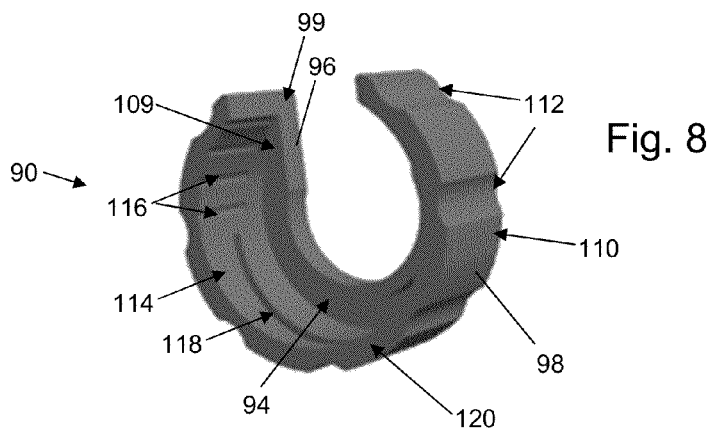
FIG. 8 is a perspective view of one embodiment of a second locking member of the device of the present invention.

As shown in FIG. 1, a fitting 11 can comprise a main body component 12 having an interior wall 13. In various embodiments, the fitting 11 can be formed (e.g., forged, cast, extruded, pressed) in brass, aluminum, steel, malleable iron or copper, with full porting and full flow fitting, for example. The interior wall 13 defines a cavity 15 extending axially through the main body component 12, wherein the main body component 12 can include first 30 and second 32 fitting retention compartments. The fitting retention compartments 30, 32 act as secure pipe receiving segments of the fitting, whereby pipe or tubing elements 24 can be inserted, retained and removed.

As further shown in FIG. 1, the inner surface 13 can be formed so as to have multiple compartments 40, 42 that receive packing arrangement elements, such as sealing rings (also known as o-rings) 14, 16, a fastening ring (also known as a grip ring) 18 and a release pusher 20. In various embodiments, the sealing rings 14, 16 can be retained within an axially inner compartment 40, and the fastening ring 18 and release pusher 20 are maintained within an axially outer compartment 42. The retention compartments 30, 32 of the fitting 11 thus comprise respective axially inner 40 and outer 42 compartments. The fastening ring 18 is provided with teeth 19 that extend radially inwardly from the outer rim of the fastening ring. These teeth are generally modestly flexible such that, when a tubing element 24 is inserted into the cavity 15, the teeth can flex axially inwardly to allow the tubing element to pass through. Typically, the fitting 11 will be provided with a tubing stop element formed in the interior wall 13 so as to provide a physical barrier preventing further insertion of the tube. Once the tubing element is fully inserted, the fastening ring teeth 19 engage the outer wall of the tubing element to prevent the tubing element from sliding out of the fitting during operation. In this way, the tubing element is securely maintained in the fitting. Further, the sealing rings 14, 16 assist in securely retaining the tubing element while also preventing fluid leaks outside of the tubing element. The release pusher 20 is provided with an axially internal rim 21. The release pusher 20 is also movable and/or slidable axially within the fitting cavity 15. As such, the pusher 20 can slide axially inwardly such that the rim 21 engages the fastening ring teeth 19 and pushes the teeth further inward, thereby allowing the tubing element to be inserted and removed without damaging the outer surface of the tubing element. In FIG. 1, the first fitting retention compartment 30 shows a fully inserted packing arrangement, while a separate packing arrangement is shown in exploded form outside of the second fitting retention compartment 32.

It will be appreciated that different fittings can employ different internal arrangements, not only in terms of the internal packing arrangements (e.g., fastening rings, o-rings, etc.), but also in terms of the number of retention compartments. For instance, a "T-connector" fitting can be provided with three retention compartments. Alternatively, another fitting may include only one pipe retention compartment. Further, embodiments of the packing arrangement may comprise only a single sealing ring, multiple sealing rings, fastening ring support members, sealing ring support members, locking release pushers and other elements. Providing proper pressure on the release pusher, regardless of fitting type and internal packing arrangement, is of paramount importance in order to provide effective function while preserving the life of the packing arrangement components and the tubing elements.

As shown in FIGS. 2 through 15, the present invention provides, in part, a release tool 10. The release tool can be employed to provide axial pressure to a pipe insertion component, such as a release pusher, for example, so as to flex the teeth of a fastening ring inwardly, which permits smooth insertion and removal of piping elements. The device can then relax the axial pressure on the pipe insertion component, which then allows the fastening ring teeth to relax back into position. In one embodiment, the present invention comprises a two-piece device with mating threads that permit the pieces to move toward and away from one another with minute adjustments.

As shown in FIGS. 3 through 6 and 12 through 15, the release tool 10 of the present invention can include a first locking member 50 having a head portion 52 and a body portion 54 extending therefrom. The head portion 52 is formed with a generally U-shaped or horseshoe-shaped interior wall 56 and a substantially rounded exterior wall 58. In various embodiments of the present invention, the outer wall can be formed with swales or indentations 59 to provide gripping areas for a user's hands during operation. In embodiments of the present invention, the head portion 52 does not maintain a consistent width W, but extends from a wide base on either side 55 having a width W to a tapered profile near the top 60 of the head portion 52 that can range from a width equal to or greater than 0.01×W, but less than W. In this way, the device can better engage different forms of fittings and pipe elements during operation, without pinching a user's hand or otherwise creating an awkward mechanical arrangement. The body portion 54 of the first locking member 50 shares a common axial center 65 with the head portion 52 and extends axially from a front wall 62 of the head portion 52. The body portion 54 can be formed in a substantially semi-circular shape in cross-section as shown in FIGS. 3 and 4, where the ends 64 of the body portion 54 do not extend to the sides 55 of the head portion 52. Alternatively, the ends 64 can extend to approximately the same extent as the sides 55 of the head portion, thereby forming a substantially U-shaped or horseshoe-shaped opening aligned with the opening of the head portion 52.

As shown in FIGS. 3 through 7, the body portion 54 has a front face 57, an interior wall 66 and an exterior wall 68, and can include one or more ridges 70 on the exterior wall 68 extending substantially axially outwardly from the front wall 62 of the head portion 52. The body portion exterior wall 68 further includes a male thread 72 extending along the exterior wall 68 of the body portion 54. Additional male threads can be provided in series back to as far as the front wall 62 of the head portion 52 in order to securely engage the second locking member 90, as described in more detail hereafter. It will be appreciated that, as the body portion 54 is not fully cylindrical, there is not a single thread that extends one or more turns around the exterior wall 68. Rather, more than one thread can be provided with appropriate spacing therebetween to threadingly engage the second locking member 90 as described elsewhere herein. It will further be appreciated that the threads 72 are angled as they extend away from the front wall 62 yet arranged in substantially parallel relation in order to properly engage the second locking member 90 as described elsewhere herein.

Figure 9:
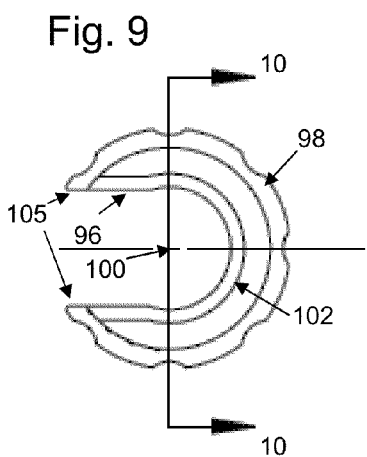
FIG. 9 is a right side view of one embodiment of a second locking member of the device of the present invention.
Figure 10:
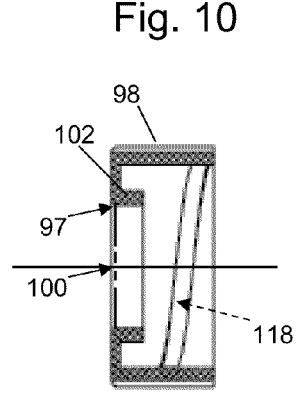
FIG. 10 shows a front cross-sectional view of one embodiment of the second locking member of the present invention taken along the line 10-10 of FIG. 9.
Figure 11:
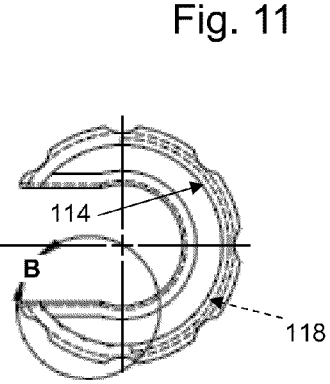
FIG. 11 is a right-side cross-sectional view of one embodiment of the second locking member of the present invention.
Figure 12:
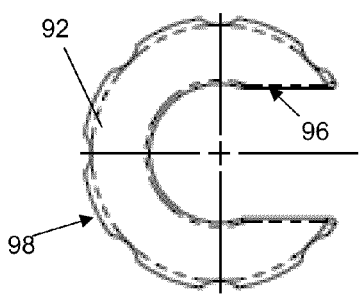
FIG. 12 is a left side view of one embodiment of the second locking member of the present invention.
Figure 13:
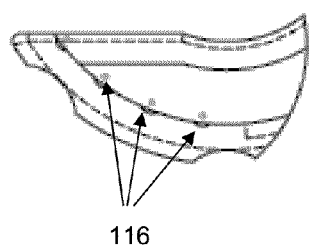
FIG. 13 is a detailed view of encircled portion B of FIG. 11.

FIGS. 8 through 13 show one embodiment of a second locking member 90 in accordance with the present invention. As shown therein, member 90 includes a back wall 92, a front wall 94, an interior face 96 and an outer body portion 98 extending outwardly from the outer circumferential edge 99 of the front wall 94. Second locking member 90 can further include an interior body portion 102 extending from an inner circumferential edge 97 of the front wall 94. In embodiments of the present invention, the outer body portion 98 and the interior body portion 102 can share the same axial center 100, as shown in FIGS. 9 and 10. In embodiments of the present invention, the interior face 96 forms a substantially U-shaped or horseshoe-shaped opening. Further, the outer body portion 98 and interior body portion 102 can be formed so as to extend to the ends 105 of the interior face 96, as shown in FIG. 9. In such embodiments, the interior body portion 102 forms a substantially U-shaped or horseshoe-shaped opening and the outer body portion 98 forms a substantially partial circular-shaped opening. Alternatively, the interior body portion 102 and the outer body portion 98 can extend only partially but not completely around the front wall 94. The front wall midportion 109 lying in between the interior body portion 102 and the outer body portion 98 is adapted to receive the front face 57 of the body portion 54 of the first locking member 50. In embodiments of the present invention, the outer body portion 98 includes an outer wall 110 having indentations 112 formed therein, and an inner wall 114 having notches 116 and at least one female thread-receiving groove 118 therein. The indentations 112 provide suitable gripping elements. The notches 116 can extend from the front wall 94 of the second locking member 90 to the front face 120 of the outer body portion 98. The notches 116 are adapted to receive the ridges 70 on the exterior wall 68 of the body portion 54 of the first locking member 50 during operation of the device of the present invention. In this way, the device can be temporarily maintained in place at a set position depending upon the fitting and piping element being joined or separated. Further, the thread-receiving groove 118 is adapted to receive the one or more male threads 72 from the first locking member during operation. It will be appreciated that the second locking member 90 can include multiple thread-receiving grooves 118 in order to accommodate the number of male receiving threads on the first locking member 50. It will further be appreciated that the thread-receiving grooves are angled as they extend away from the front wall 94 yet arranged in substantially parallel relation. The pitch or angle of the thread and thread-receiving groove can be adapted according to desired aggressiveness, i.e., a lower pitch provides more gradually increasing and decreasing pressure while a higher pitch provides more abruptly increasing and decreasing pressure.

In one embodiment of the present invention, as shown in FIG. 18, the male threads 72 are substantially T-shaped in cross-section, including a base portion 130 and a tip portion 132 that has a left edge 134 and a right edge 136 that extend outwardly of the base portion 130. In this embodiment, the thread-receiving grooves 118 of the second locking member are appropriately formed so as to fittingly engage the male thread members 72 when the first and second locking members are engaged. The T-shaped arrangement of the male thread(s) 72 and the groove(s) 118 facilitates retention of the male thread(s) within the groove(s) during operation, and also facilitates strength of the vise-like pressure created as the first and second locking members are engaged during operation, as described elsewhere herein.

In operation of the present invention, the first member 50 and second member 90 are aligned side-by-side and the male thread 72 of the first member 50 is engaged with the thread-receiving groove 118 of the second member 90 but only to a degree that initially enjoins the first and second members such that the horseshoe-shaped openings thereof are aligned, as shown in FIG. 14, and in position above a retention compartment of a fitting. It will be appreciated that the fitting is one incorporating some type of release pusher as described above, and that the fitting either is being adapted so as to receive a tube to be inserted, or so as to release a previously inserted tube. With reference to FIGS. 14 to 17, the first member 50 can be positioned axially inwardly of the fitting, and to one side of the retention compartment, and the second member 90 can be positioned on the other side of the retention compartment. In practical application, this order can be reversed. Regardless of arrangement, though, the axially exterior member can then be rotated such that the male thread 72 of the first member 50 further engages the thread-receiving groove 118 of the second member 90. When the members are first engaged, there is a gap 140 between the outer body portion 98 of the second locking member 90 and the front wall 62 of the first locking member 50, and the gap 140 decreases in size as the members are secured more closely together, i.e., as they are rotated such that the thread members 72 further engage the thread-receiving grooves 118. In embodiments of the present invention, as the members are secured more closely together, one or more ridges 70 on the exterior wall 68 of the body portion 54 of the first locking member 50 can engage one or more notches 116 on the second locking member 90. In this way, varying degrees of engagement can be set in place and held by the device. Further, as the members are secured more closely together, the face 57 of the body portion 54 of the first locking member 50 moves towards the front wall 94 of the second locking member in between the interior body portion 102 and the outer body portion 98 thereof. Further, the interior body portion 102 of the second member 90 moves towards the release pusher element 20 of the packing arrangement of the fitting 11. As the interior body portion 102 pushes the release pusher 20, the release pusher 20 pushes the teeth 19 of the fastening ring 18, which thereby makes room for a piping element 24 to be easily inserted, and/or lifts the fastening ring teeth 19 off of a previously inserted piping element 24 in order to allow the piping element 24 to be smoothly removed. Once the desired action has occurred, the first locking member 50 can be unscrewed from the second locking member 90 and the members removed.

It will be apparent that methods of providing a release tool in accordance with the present invention include providing a first locking member with walls, segments and portions as identified above, and providing a second locking member with walls, segments and portions as identified above. It will further be apparent that methods of relaxing a fastening ring in order to enable the insertion or removal of a piping element within a fitting are provided in accordance with the above description.

The invention may be embodied in other specific forms without departing from the spirit or essential characteristics thereof. The present embodiments are therefore to be considered in all respects as illustrative and not restrictive, the scope of the invention being indicated by the claims of the application rather than by the foregoing description, and all changes which come within the meaning and range of equivalency of the claims are therefore intended to be embraced therein.

The invention claimed is:

1. A release tool for facilitating the insertion or release of a pipe element within a fitting, comprising:
   a first locking member having a head portion with a front wall and an interior wall, wherein the interior wall forms an opening through the head portion, the first locking member further including a body portion extending from the front wall of the head portion, wherein the body portion includes an exterior wall having at least one male thread member thereon; and
   a second locking member having a front wall, a back wall and an interior face, wherein the interior face forms an opening in the second locking member, the second locking member further including an outer body portion and an interior body portion, both extending axially inwardly from the front wall, wherein the outer body portion includes an inner wall having at least one thread-receiving groove therein whereby the thread-receiving groove can receive the at least one male thread such that the first and second locking members can releasably enjoin together, and such that, when enjoined, the interior body portion of the second locking member can be moved towards a fitting to facilitate insertion or release of a piping element within the fitting.

2. The tool of claim 1 wherein the first locking member interior wall is substantially U-shaped and wherein the second locking member interior face is substantially U-shaped.

3. The tool of claim 1 wherein the body portion of the first locking member is substantially circular in cross-section.

4. The tool of claim 1 wherein the head portion has a pair of sides, and wherein the body portion has a pair of ends, and wherein the body portion ends do not extend to the same extent as the pair of sides.

5. The tool of claim 1 wherein the exterior wall of the body portion of the first locking member includes one or more ridges extending outwardly therefrom.

6. The tool of claim 1 wherein the exterior wall of the body portion of the first locking member includes a plurality of male threads.

7. The tool of claim 1 wherein the second locking member front wall has inner and outer circumferential edges, and wherein the interior body portion extends from the inner circumferential edge and the outer body portion extends from the outer circumferential edge.

8. The tool of claim 1 wherein the interior body portion of the second locking member extends partly but not completely around the front wall.

9. The tool of claim 1 wherein the outer body portion of the second locking member extends partly but not completely around the front wall.

10. The tool of claim 5 wherein the outer body portion inner wall of the second locking member includes at least one notch for aligning with the one or more ridges of the exterior wall of the body portion of the first locking member.

11. The tool of claim 1 wherein the at least one male thread member includes a base portion and a tip portion having left and right edges, such that the at least one male thread member is substantially T-shaped in cross-section.

12. A method of providing a release tool for facilitating the insertion or release of a pipe element within a fitting, comprising:
    providing a first locking member having a head portion with a front wall and an interior wall, wherein the interior wall forms an opening through the head portion, the first locking member further including a body portion extending from the front wall of the head portion, wherein the body portion includes an exterior wall having at least one male thread member thereon; and
    providing a second locking member having a front wall, a back wall and an interior face, wherein the interior face forms an opening in the second locking member, the second locking member further including an outer body portion and an interior body portion, both extending axially inwardly from the front wall, wherein the outer body portion includes an inner wall having at least one thread-receiving groove therein whereby the thread-receiving groove can receive the at least one male thread such that the first and second locking members can releasably enjoin together, and such that, when enjoined, the interior body portion of the second locking member can be moved towards a fitting to facilitate insertion or release of a piping element within the fitting.

13. The method of claim 12 wherein the first locking member interior wall is substantially U-shaped and wherein the second locking member interior face is substantially U-shaped.

14. The method of claim 12 wherein the body portion of the first locking member is substantially circular in cross-section.

15. The method of claim 12 wherein the head portion has a pair of sides, and wherein the body portion has a pair of ends, and wherein the body portion ends do not extend to the same extent as the pair of sides.

16. The method of claim 12 wherein the exterior wall of the body portion of the first locking member includes one or more ridges extending outwardly therefrom.

17. The method of claim 12 wherein the exterior wall of the body portion of the first locking member includes a plurality of male threads.

18. The method of claim 12 wherein the second locking member front wall has inner and outer circumferential edges, and wherein the interior body portion extends from the inner circumferential edge and the outer body portion extends from the outer circumferential edge.

19. The method of claim 12 wherein the interior body portion of the second locking member extends partly but not completely around the front wall.

20. The method of claim 12 wherein the outer body portion of the second locking member extends partly but not completely around the front wall.

21. The method of claim 16 wherein the outer body portion inner wall of the second locking member includes at least one notch for aligning with the one or more ridges of the exterior wall of the body portion of the first locking member.

22. The method of claim 12 wherein the at least one male thread member includes a base portion and a tip portion having left and right edges, such that the at least one male thread member is substantially T-shaped in cross-section.

23. A method of facilitating insertion or removal of a piping element in a fitting, comprising:
   providing a first locking member having a head portion with a front wall, the first locking member further including a body portion extending from the front wall of the head portion, wherein the body portion includes an exterior wall having at least one male thread member thereon;
   providing a second locking member having a front wall, a back wall, an outer body portion and an interior body portion, both extending axially inwardly from the front wall, wherein the outer body portion includes an inner wall having at least one thread-receiving groove therein;
   inserting the at least one male thread member into the at least one thread-receiving groove such that there is a gap between the front wall of the first locking member and the outer body portion of the second locking member;
   positioning the first and second locking members around a fitting; and
   increasingly engaging the first locking member with the second locking member so as to reduce the size of the gap, thereby causing the interior body portion of the second locking member to move towards the fitting to facilitate insertion or removal of a piping element within the fitting.

* * * * *